United States Patent [19]
Ringwald et al.

[11] Patent Number: 5,609,523
[45] Date of Patent: Mar. 11, 1997

[54] COTTON BASKET LATCH STRUCTURE

[75] Inventors: Jeffrey J. Ringwald, Ankeny; Jeffrey R. Fox, Minburn, both of Iowa

[73] Assignee: Deere & Company, Moline, Ill.

[21] Appl. No.: 514,280

[22] Filed: Aug. 11, 1995

[51] Int. Cl.⁶ .................................................. A01F 12/60
[52] U.S. Cl. ............................................. 460/119; 56/28
[58] Field of Search ................................... 460/119, 150, 460/149; 56/28, 1, 16.4 R

[56] References Cited

U.S. PATENT DOCUMENTS

| | | | |
|---|---|---|---|
| 4,930,297 | 6/1990 | Schlueter et al. | 56/28 X |
| 4,996,831 | 3/1991 | Pearson et al. | 56/16.6 |
| 5,088,274 | 2/1992 | Garter et al. | 56/30 |

Primary Examiner—Terry Lee Melius

[57] ABSTRACT

A telescoping cotton harvester basket includes latches adjacent the four corners of the basket and spring loaded to automatically lock a basket extension in position as the extension moves from a retracted storage position to an extended harvest position. The latches are connected by fore-and-aft extending linkages and a transverse shaft for operation in unison from a single location to release the basket extension for movement back to the retracted storage position. A reset mechanism automatically moves the latches to a closed or locking position in preparation for the subsequent movement of the basket back to the extended harvest position so that only one manual activation of the latches is required for a complete basket extension-retraction cycle.

20 Claims, 5 Drawing Sheets

COTTON BASKET LATCH STRUCTURE

BACKGROUND OF THE INVENTION

1) Field of the Invention

The present invention relates generally to basket structure for cotton harvesters, and more specifically to latch structure for releasably securing a telescoping basket in the extended harvesting position.

2) Related Art

Some presently available cotton harvesters such as the John Deere Model 9965 Cotton Picker include an upper basket extension which is telescopingly received within a main lower basket section. Hydraulic cylinders move the extension between a reduced height transport or storage position and a raised harvest position wherein basket capacity is increased. Usually, some form of mechanical latching arrangement positively locks the basket in the harvest position.

Many previously available latching arrangements lock the basket extension in place only after a manual operation has been performed. A second manual operation is required to release the basket extension for movement to the transport position. In the past, manually removable pins have been used to secure the corners of the baskets. Over-center channel members with quick lock pins, such as shown in U.S. Pat. No. 4,996,831, have also been used. Locking and unlocking of the basket extension requires the operator to move to up to four different locations on the basket to carry out the latching and unlatching functions. At times, the operator has some difficulty inserting or removing pins. As a result, moving the basket extension between transport and raised positions can be time consuming and inconvenient.

BRIEF SUMMARY OF THE INVENTION

It is therefore an object of the present invention to provide an improved basket locking structure for a telescoping cotton harvester basket. It is a further object to provide such as structure which overcomes most or all of the aforementioned problems.

It is another object of the invention to provide an improved basket extension locking structure which obviates the need for insertable pins or other manually operated devices at each side of the basket. It is another object to provide such a structure which reduces the time and effort required for the operator to extend or retract the basket extension.

It is still a further object of the invention to provide an improved locking structure for an extendible cotton harvester basket operable from a single location to selectively unlatch the extension at a plurality of locations around the basket. It is a further object to provide such a structure which automatically latches the basket extension as the extension reaches an increased capacity harvesting position. It is a further object to provide such a structure which positively and reliably locks the basket extension.

It is yet another object to provide an improved locking structure for the extension of a telescoping cotton basket, the structure having an automatic reset feature so that the basket extension will be locked in position as the extension is raised from the transport position without need for the operator to perform a manual reset function after the extension has been released and lowered from the extended harvesting position.

In accordance with the above objects, a telescoping cotton basket includes a stationary lower basket portion of rectangular configuration having spring loaded hook members pivotally connected adjacent each corner. The basket includes a mating extension portion telescopingly received within the lower basket portion and having a pin at each corner which engages the corresponding hook member on the lower basket portion when the extension portion is raised to an increased capacity harvest position. The spring loaded hooks have both open and latching over center positions and are connected to a single operating handle by linkages extending along the upper framework of the lower basket portion. To release the basket extension from the extended harvest position, the handle is rotated causing the hooks to move from the over center latching positions to the over center open positions. As the basket extension is lowered by hydraulic cylinders to a storage position, a reset member on the extension frame contacts a portion of the linkages causing the hooks to move back to the over center latching positions so that the basket extension will be automatically locked in position as the hooks engage the pins upon raising of the extension to the harvest position.

The linkage connected latching arrangement reduces the time and effort required for changing the basket between the extended harvest position and the lowered transport position. The latches are automatically reset as the basket extension is lowered, and therefore only one manual operation at a single location is required to release the basket extension from the locked harvest position and prepare the basket for movement back to the locked extension position.

These and other objects, features and advantages of the present invention will become apparent to one skilled in the art upon reading the following detailed description in view of the drawings.

DETAILED DESCRIPTION OF THE DRAWINGS

Figure 1:
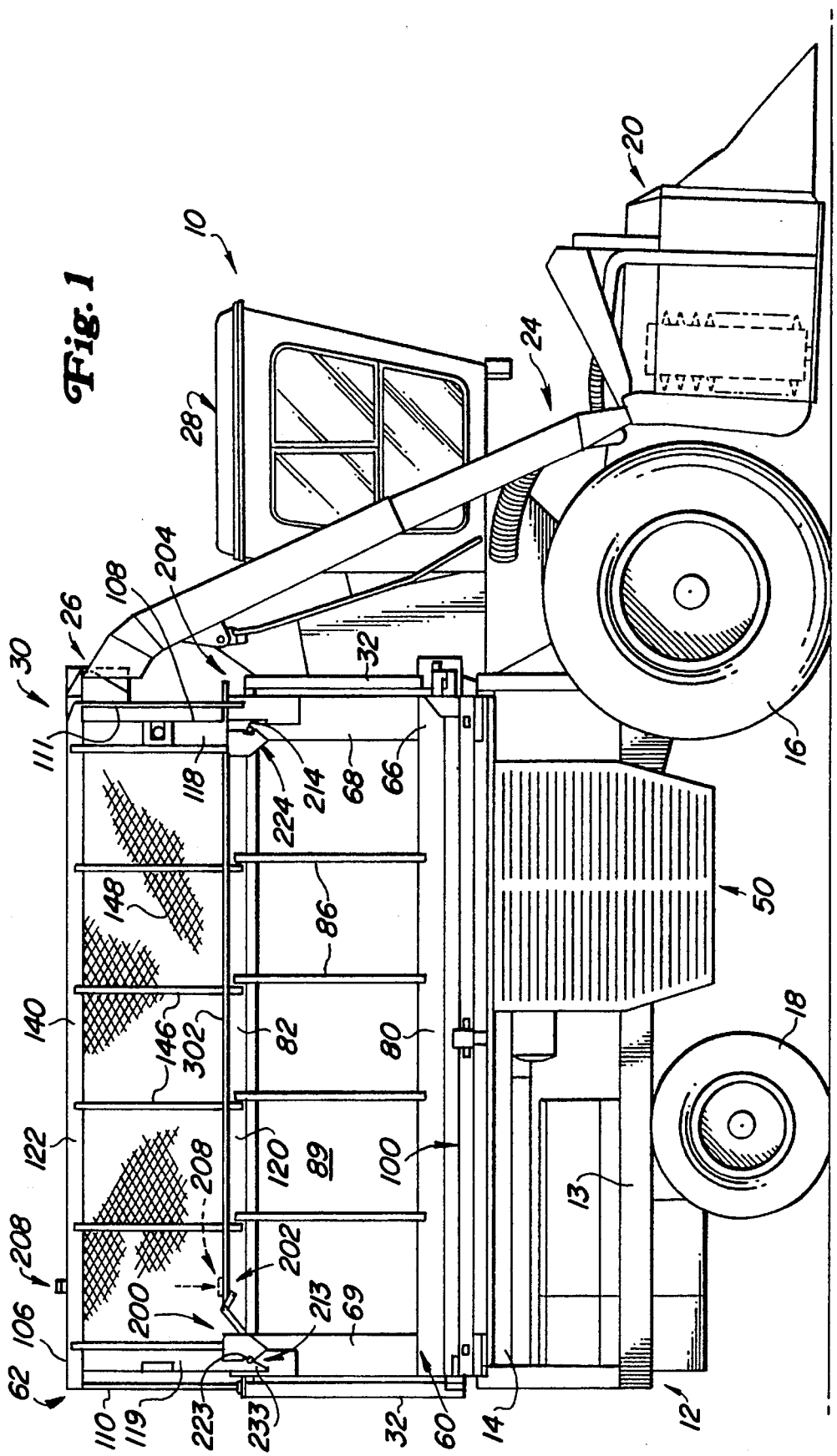
FIG. 1 is a side view of a cotton harvester with a telescoping basket having latching structure shown in the locked position for securing a basket extension in a raised harvest position.

Referring now to FIG. 1, therein is shown a portion of a cotton harvester 10 having a main frame 12 with lower and upper generally rectangular frame sections 13 and 14 supported for forward movement over the ground by left- and right-hand front drive wheels 16 and by rear steerable wheels 18. Cotton harvesting structure 20 is supported at the forward end of the main frame 12 for removing cotton from plants, and an air system indicated generally at 24 directs the harvested cotton rearwardly and upwardly to a discharge area 26 behind a cab 28. A cotton basket 30 receives the cotton discharged from the area 26.

Lower ends of upright tubular beams 32 are fixed to the beams of the main frame 12 and diverge in the upward direction. The upper rectangular frame section 14 is located just below the bottom of the basket 30 and is supported parallel to the lower frame structure 13. An engine, fan and hydraulic pump structure, as well as other conventional harvester components, are supported from the frame 12 at a location indicated generally at 50 between the wheels 16 and 18.

The basket 30 includes a box-like lower basket portion 60 for containing cotton, and an upper basket or extension portion 62 telescopingly received within the portion 60 for movement between a lowered transport position and an extended or raised field-working position (shown). The lower basket portion 60 includes a box-like framework 66 having front and rear corner posts 68 and 69. As best seen in FIG. 1, lower and upper horizontal frame members 80 and 82 of rectangular configuration connect the corner posts 68 and 69. Vertical supports 86 extend between the members 80 and 82 between the posts 69. Wire screens or mesh panels 89 are secured to sides of the framework 66 to define a lower cotton-receiving area which opens outwardly towards a dump side of the basket opposite the side shown in FIG. 1. The lower cotton-receiving area is closed at the bottom by floor conveyor structure indicated generally at 100.

The upper basket or extension portion 62 includes a framework 106 which is telescopingly supported by the lower framework 66 and has generally a box-like construction closed to cotton at the top and sides and the aft end but open at the bottom. The basket portion 62 has a front 108 (FIG. 1) which opens forwardly near the top of the basket to receive cotton blown rearwardly from the discharge area 26. The open bottom communicates with the lower basket portion 60. A rear center extension cylinder 110 (FIG. 1) and forward extension cylinder 111 move the basket portion 62 vertically within the basket portion 60 between the field-working and transport positions.

The upper framework 106 includes front and rear corner posts 118 and 119 connected by lower and upper rectangular frame structures 120 and 122. Lower and upper fore-and-aft extending frame members 140 extend between the corner posts 118 and 119. Upright members 146 extend between the members 140, and mesh panels 148 (FIG. 1) secured to the members 140 and 146 and the posts 118 and 119 close the sides of the upper basket portion 62 to cotton. Mesh panels 148 secured between the posts 118 and 119, frame structures 120 and 122, and the upright members 146 close the basket to harvested cotton blown in through the openings in the front 108. The basket has a dump side for unloading the cotton into a receptacle such as a module builder or trailer. The harvester 10 and basket structure are described herein with sufficient detail to orient the latching structure described below. If further details of the structure are desired, reference may be had to U.S. Pat. No. 5,407,390 which is of common ownership with the present application. It is to be understood that the latching structure described in detail below may be used with different types of telescoping baskets.

The Basket Latch Structure

Figure 3:
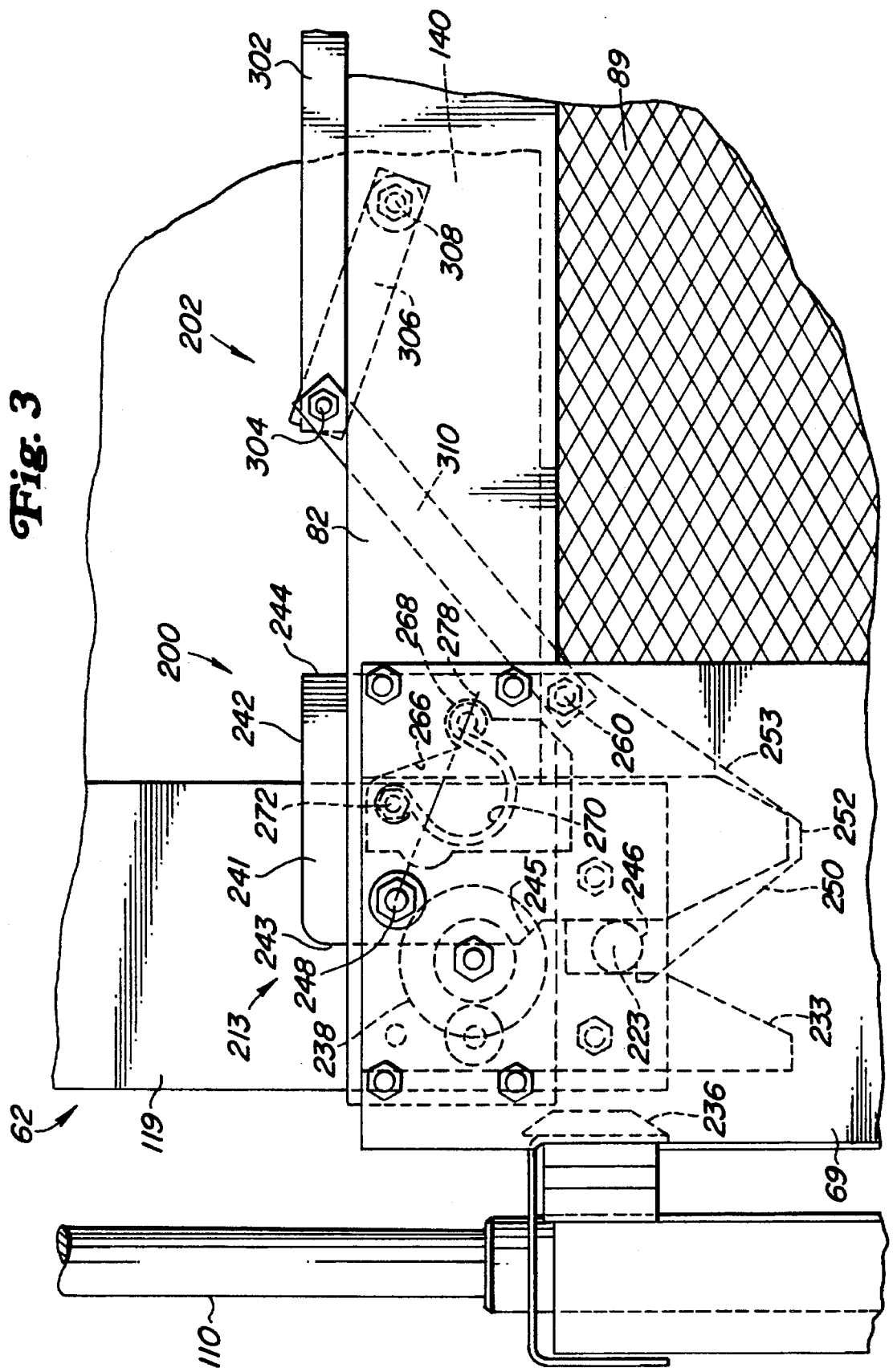
FIG. 3 is an enlarged side view of a portion of the rear corner of the basket shown in FIG. 1 showing the latching structure in the closed or latching position.

Movable latch structure indicated generally at 200 is located at spaced locations along the basket, preferably near each corner of the basket, and is connected by linkage structure 202 for movement between a first over center or latched position (FIG. 3) for securing the basket extension portion 62 in the raised field-working position and second over center or open release position for permitting the extension portion to be retracted to the transport position.

Handle structure 204 is connected to the linkage structure 202 at one corner (the left forward corner as shown in the Figures) for operating the latch structure from a single basket location. Moving the handle structure 204 down with the cylinders 110 and 111 fully extended (FIGS. 4 and 5) causes the linkage structure to move the latch structure 200 from the latched position to the release position so the extension portion 62 can thereafter be retracted by the cylinders. A reset member 208 connected to the extension portion 62 contacts the linkage structure 202 as the extension portion moves to a location offset from the harvest position to reset the latch structure 200 to the latching positions so that the extension portion 62 will be automatically latched when the extension portion moves back into the extended harvest position.

Figure 2:
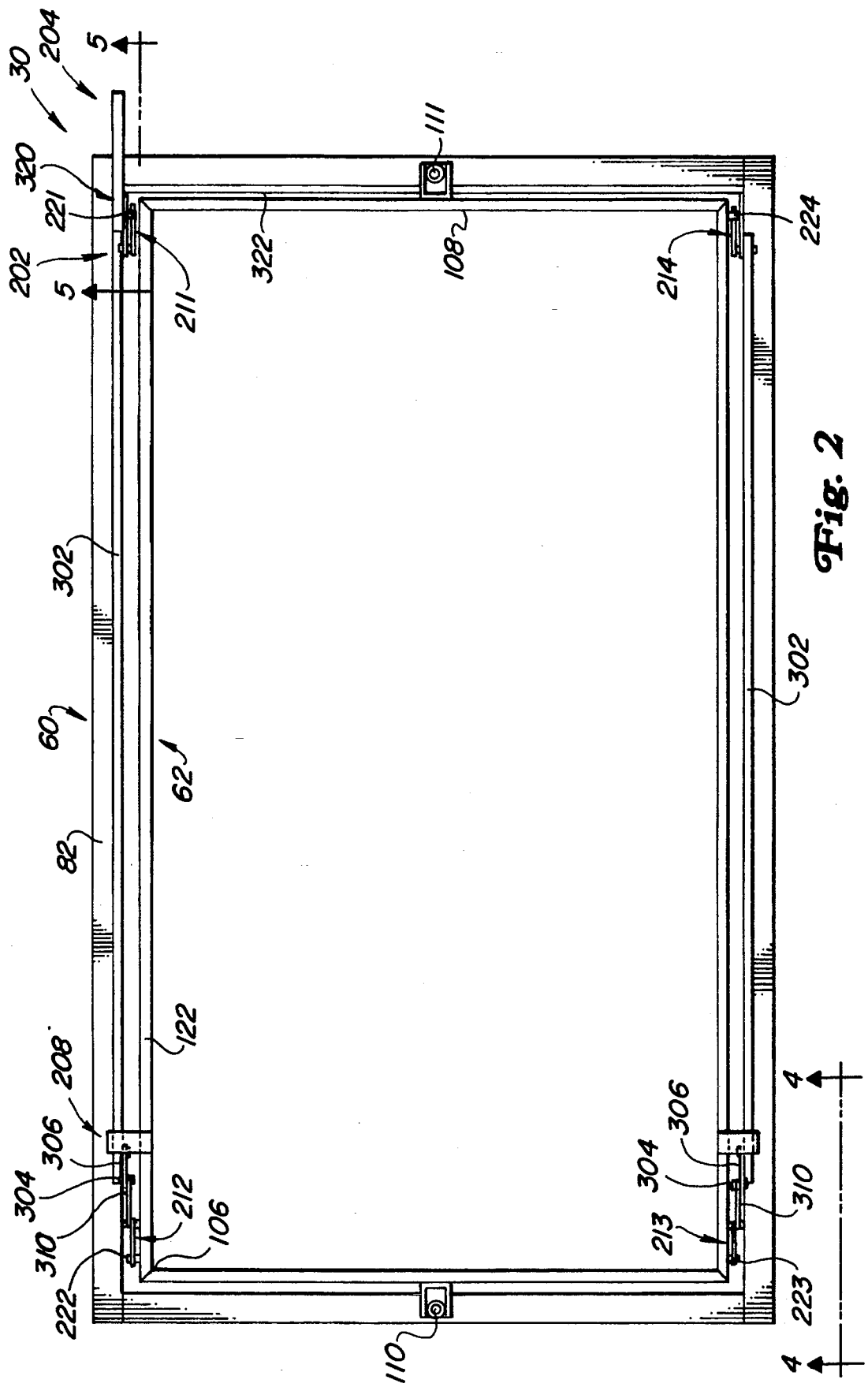
FIG. 2 is a top view of the basket shown in FIG. 1.

The latch structure 200 includes four pivoting hook members or latches 211, 212, 213, and 214 supported by the upper frame member 82 inwardly adjacent the four corners of the lower basket portion 60 (FIG. 2). Each of the latches 211–214 is configured and operated in generally the same manner and is movable by the linkage structure 202 between the two stable or over center spring biased positions. Mating pins 221, 222, 223 and 224 project outwardly from the corresponding corner posts 118 and 119 of the extension portion 62 to cam open the latches 211, 212, 213 and 214, respectively, as the extension portion 62 moves into the field-working position. Inverted V-shaped guide members 231–234 supported by the upper frame member 82 in the path of the pins 221–224, respectively, stabilize the extension portion 62 and help guide the pins, first into camming contact and then into locking relationship, with the respective latches 211–214. Anti-friction tapered guides 236 and 238 are located on the inside corners of the lower basket portion 60 to provide smooth telescoping of the extension portion 62.

The construction and operation of each of the latches 211–214 is substantially identical and includes a latch plate 241 which is substantially planar and, in the latching position (see FIG. 3), has a horizontally extending upper edge 242 joining upright edges 243 and 244. At a central location 245, the edge 243 angles inwardly in the downward direction to a J-shaped hooked portion 246 which captures the corresponding pin when the basket portion 62 is extended. A pivot 248 connects the latch plate 241 to the inside of the upper frame members 82 near the basket corner. The plate 241 is rockable about a transverse axis located above the hooked portion 246. A camming surface 250 tapers inwardly from the hooked portion 246 so the pin (223 in FIGS. 3 and 4) can pivot the plate 241 aside as the basket extension portion 62 approaches the fully extended position. The guide member 228 funnels the pin 224 into proper alignment with the latch and lends fore-and-aft stability to the upper basket portion 62 in the extended position.

The plate 241 has a lowermost edge 252 extending inwardly from the camming surface 250 to a juncture with a lower angled edge 253. The edge 253 extends inwardly and upwardly to a juncture with the upright edge 244. The linkage structure 202 for the rear latches 212 and 213 is pivotally connected at 260 to the plate 241 near the juncture of the edges 244 and 253. The left front latch 211 (FIG. 5) is connected to the linkage structure 202 and to the handle structure 204 near the juncture between the edges 242 and 244. An aperture 266 with a spring-receiving slot 268 is located between the edges 243 and 244. A U-shaped spring 270 has a first eye end pivotally connected at 272 to the frame member 82 and a second eye end captured in the slot 268. The spring 270 compresses as the latch moves from the latched position (FIG. 3) towards a central position between latched and open positions. When the latch moves away from the closed position and beyond the central position wherein a radial line 278, extending from the pivot 248 through the eye end in the slot 268, passes beyond the spring pivot 272, the spring 270 begins to relax. The spring 270 biases the latch to the over center closed position when the latch is between the closed and central positions, and towards the over center open position (FIG. 4) when the latch is between the central and open positions. The latch therefore has two stable positions, open and closed.

The linkage structure 202 includes a pair of fore-and-aft extending links 302 pivotally connected at their aft ends at 304 to upper ends of drag links 306. Each drag link 306 has a lower end pivotally connected at 308 to the frame member 82. A connecting link 310 has an aft end connected to the rear latch at the location 260 and a forward end connected to the links 302 and 306 at the location 304. The pair of links 302 have forward ends pivotally connected at 314 to the forward latches 211 and 214 near the upper inwardly located corner of the plates 241 so that the front and rear latches move substantially in unison between the open and closed positions. A rotating shaft assembly 320 is connected between the forward latches 211 and 214 so that the forward latches move in unison. The shaft assembly 320 includes a shaft 322 supported from the front member of the frame member 82 for rotation about a transversely extending axis. Opposed reset arms 324 (FIG. 5) at opposite ends of the shaft 322 each include an upright arm 328 having a lower end welded to the shaft 322 and a connecting arm 330 extending rearwardly from the arm 328 to a slotted pivotal connection to the plate 241 at the location 314. The handle structure 204 is fixed to the connecting arm 330 for the left front latch 211 and extends forwardly to a location conveniently located with respect to the cab 28.

Figure 4:
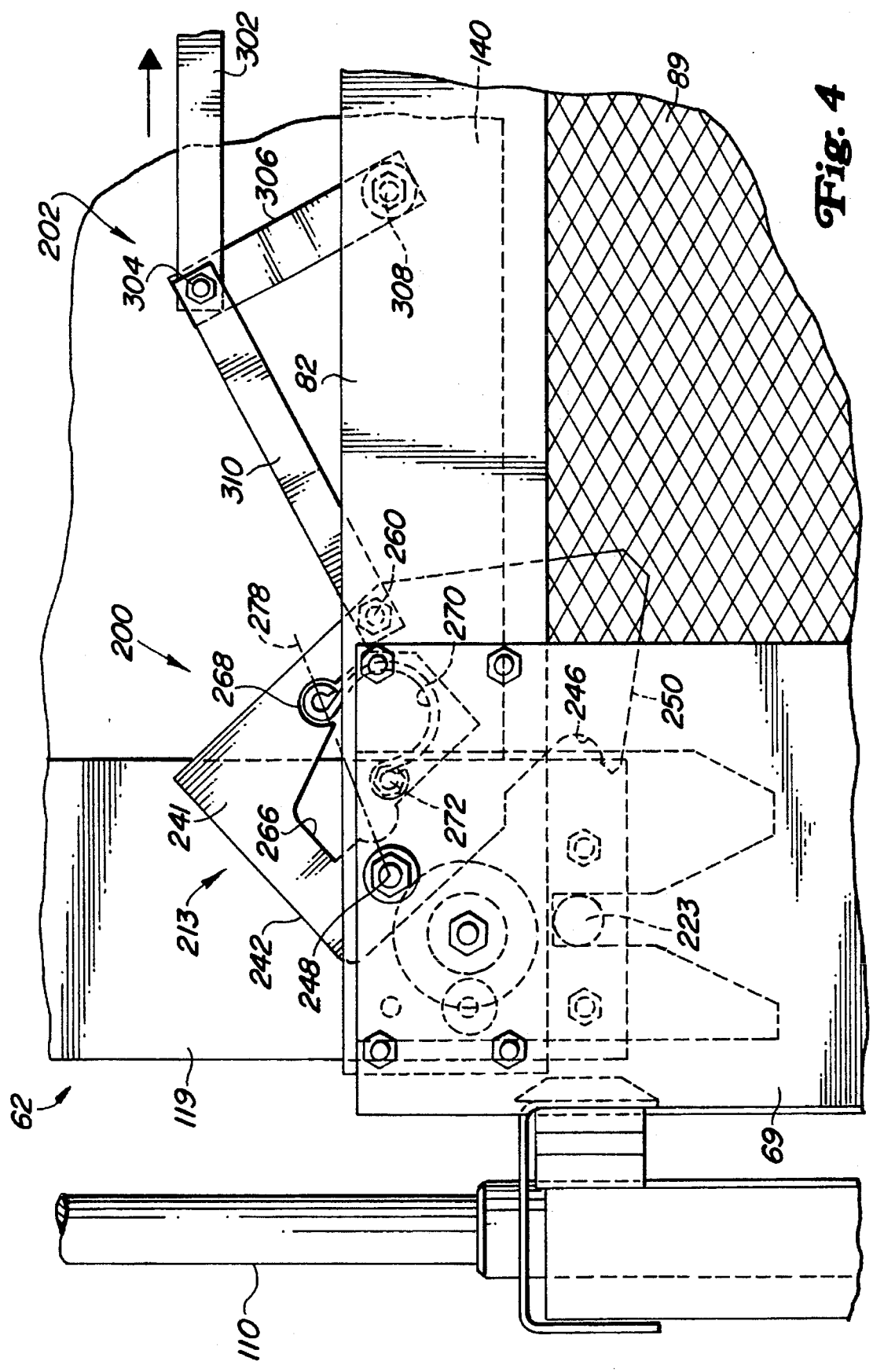
FIG. 4 is a view similar to that shown in FIG. 3, and taken generally along lines 4—4 of FIG. 2, but with the latching structure in the open release position in preparation for retraction of the basket to the storage position.
Figure 5:
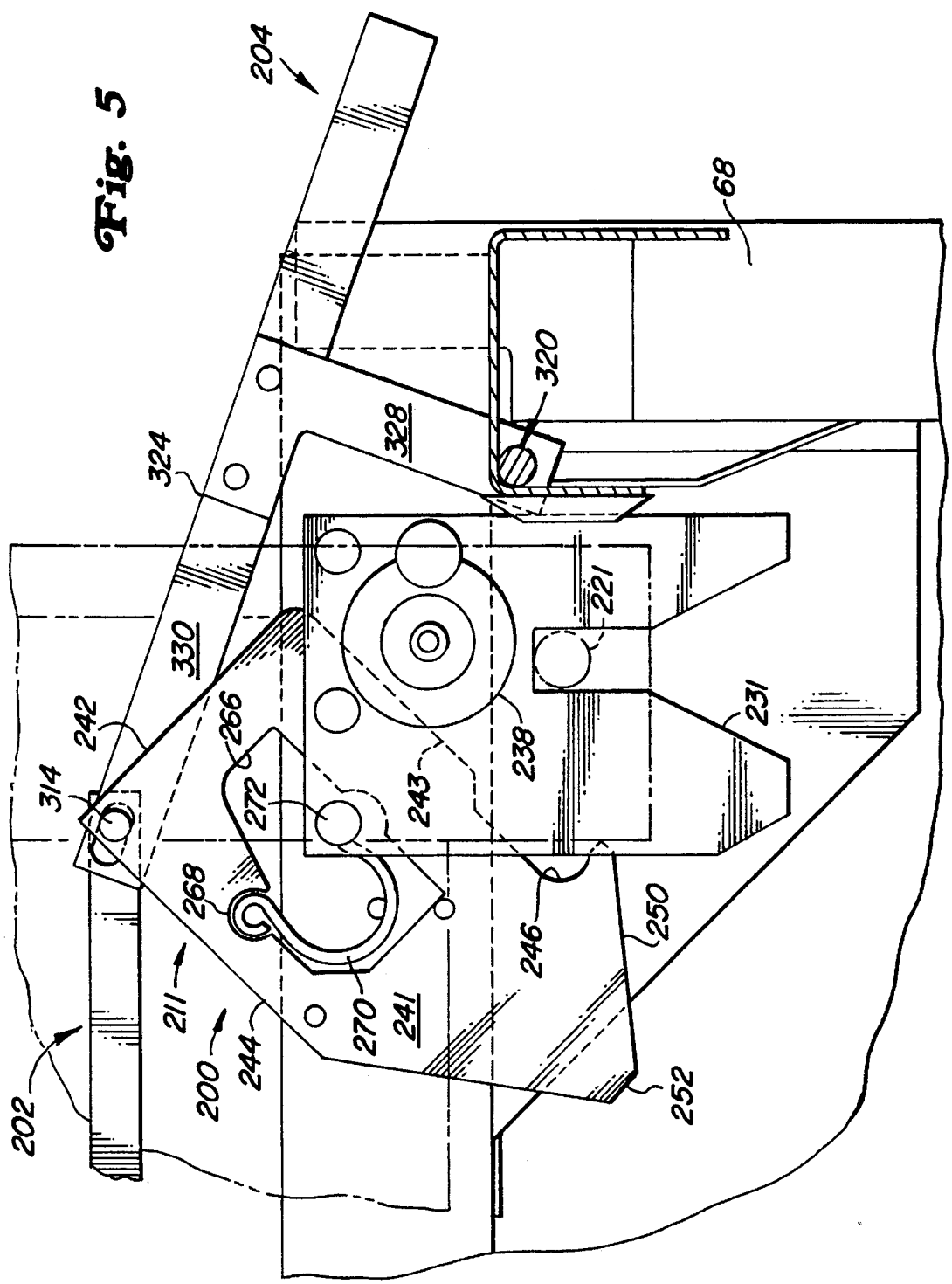
FIG. 5 is a view taken generally along lines 5—5 of FIG. 2 and showing the handle structure in the release position.

Assuming the basket 30 is in the extended harvest position, the pins 221–224 are resting in the hooked portions 246 (FIG. 3) of the respective latches 211–214 to lock the extension portion 62 in the extended harvest position as shown in FIG. 1. After the operator is finished harvesting a field and desires to decrease the height of the basket 30 for transport or storage, he first fully extends the cylinders 110 and 111 to lift the pins 221–224 slightly from the J-shaped hooked portion 246 (FIGS. 4 and 5) so that the latch plates 241 can be pivoted from the latched or closed positions. He then pulls on the end of the handle structure 204, which is conveniently located adjacent the operator station 340, to rotate the structure (FIG. 5) and move the latch 211 to the open position. At the same time, the shaft assembly 320 rotates with the handle structure 204 to pivot the opposite front latch 214 to the over center open position. The elongated links 302 move forwardly with rotation of the front latches to the open position and cause the rear latches 212 and 213 to rotate to the over center open position (FIG. 4). The springs 270 maintain the latches 211–214 in the over center open position. With the latches released, the operator then retracts the cylinders 110 and 111 to move the extension portion 62 downwardly within the lower basket portion 60. As the portion 62 moves to the retracted storage position, the reset member 208 contacts the forward portion of the link 302 (see arrow and broken lines of FIG. 1, and FIG. 2) and urges the link downwardly which, in turn, moves the latches 211–214 back to the over center latching position. The latches 211–214 may also be moved manually back to the latching position by rotating the handle member 204 upwardly from the unlatching position to a generally horizontal position.

To ready the basket for harvesting, the operator simply extends the cylinder 110 and 111 to move the extension portion 62 upwardly towards the extended harvest position. The pins 221–224 move upwardly into contact with the camming surfaces 250 to pivot the latches 211–214 and allow the pins to move up to the top portion of the guides 231–234. The slotted pivotal connection at 314 (FIG. 5) permits limited latch movement during pin engagement without movement of the handle structure 204. Once the pins clear the J-shaped hooked portions 246, the latches move back to the fully closed or latched positions. The pins 221–224 rest on the hooked portions 246 to prevent retraction of the extension portion 62 and thereby lock the basket 30 in the extended harvest position. The linkage structure 202 and shaft assembly 320 lie in close proximity to the frame member 82 (FIGS. 1–3) to limit exposure of these elements.

Having described the preferred embodiment, it will become apparent that various modifications can be made without departing from the scope of the invention as defined in the accompanying claims.

We claim:

1. In a cotton harvester having a fore-and-aft extending frame adapted for forward movement over a field of cotton plants, a cotton basket structure for receiving harvested cotton and unloading the harvested cotton, the basket structure including a telescoping basket having a main basket portion and an extension portion telescopingly received by the main basket portion, means for moving the extension portion between an extended harvest position and a retracted storage position, and latching structure for releasably securing the extension portion in the harvest position, the latching structure comprising:

movable latch structure including a plurality of latches located at spaced locations on the basket structure, the latches having latching positions for automatically securing the extension portion in the extended harvest position as the extension portion moves into the extended harvest position, and a release position for permitting retraction of the extension portion from the harvest position towards the storage position;

linkage structure operably connecting the latches for movement in unison between the release position and the latching position; and a reset member connected to the basket structure and contacting the linkage structure as the extension moves to a location offset from the harvest position and thereby moving the latches to the latching positions to position the latches for automatic securing of the extension portion when the extension next moves into the extended harvest position.

2. The invention as set forth in claim 1 further comprising a single lever connected to the linkage structure for operating the latches in unison from a single location.

3. The invention as set forth in claim 1 wherein the basket includes four corners and a latch is located at each corner, the linkage structure including a pair of links extending between latches on opposite corners of the basket.

4. The invention as set forth in claim 3 further comprising a shaft connecting the pairs of links for movement together.

5. The invention as set forth in claim 3 wherein the lower basket portion includes an upper frame member, and wherein the pair of links extend adjacent the upper frame member.

6. The invention as set forth in claim 5 wherein the reset member is connected to the extension portion and defines a path as the extension portion moves between the harvest and storage positions, and wherein at least one of the pair of links lies in the path for contact by the reset member during movement of the extension portion.

7. The invention as set forth in claim 1 wherein the latches include an over center member having a first over center position corresponding to the latching position and a second over center position corresponding to the release position, and further including reset structure for automatically moving the over center member from the second over center position to the first over center position after the extension is moved from the harvest position.

8. The invention as set forth in claim 7 including pin structure connected to the extension portion, wherein the over center member is connected to the lower basket portion and contacts the pin structure when the extension portion is moved to the harvest position with the latches in the latching position, the pin structure moving the over center member as the basket approaches the extended harvest position.

9. The invention as set forth in claim 7 wherein the latches are spring biased towards a closed position when the over center member is in the first position and are movable against the bias as the extension portion moves to the extended harvest position.

10. The invention as set forth in claim 1 wherein the main basket portion has an upper rectangular frame structure with corners and wherein the latches are located adjacent the corners of the frame structure, and wherein the extension portion has a frame with upright corner posts, and further including mating members projecting from lower ends of the corner posts and movable into engagement with the latches as the extension portion is moved to the extended harvest position.

11. In a telescoping cotton basket including a lower basket portion of rectangular configuration, a mating extension portion telescopingly received within the lower basket portion, cylinder structure for moving the extension portion between a raised harvest position and a lowered storage position, hook members pivotally connected to the lower basket portion at spaced locations, the hooks having open positions and latching positions, mating pins connected to the extension portion for engaging the hook members on the lower basket portion to secure the extension portion in the harvest position when the hooks are in the latching position and the extension portion is raised to the raised harvest position, a movable operator control, and linkage structure connected to the hooks and responsive at least in part to movement of the operator control for moving the hooks generally in unison between the open and latching positions, the latches when in the open position permitting movement of the extension portion from the harvest to the storage position, and reset structure connected to the basket and responsive to extension position for moving the hooks to the latching positions.

12. The invention as set forth in claim 11 wherein the linkage structure includes an axially movable link connected between hooks on one side of the basket, and a rotating shaft connected between one of said hooks on one side of the basket and another hook located on a side of the basket opposite said one side.

13. The invention as set forth in claim 11 wherein the reset structure is connected for movement with the extension portion, and wherein the linkage structure responsive to movement of the reset structure for moving the hooks from the open position to the latching position after the extension portion moves away from the latched harvest position.

14. The invention as set forth in claim 11 wherein the hooks are spring biased and have first and second over center stable positions corresponding to the open and latching positions, respectively.

15. The invention as set forth in claim 14 wherein the linkage structure includes an elongated link having a first end pivotally connected to a first one of the hooks for movement therewith and second end connected to a second one of the hooks, and an operator control connected to the linkage structure for moving the first and second hooks generally in unison.

16. The invention as set forth in claim 15 including a shaft operably connected to the operator control and to a third one of the hooks at a location offset transversely from the first one of the hooks.

17. The invention as set forth in claim 16 further including a second elongated link having a first end connected to the third one of the hooks and a second end, and a fourth hook connected to the second end of the second elongated link.

18. The invention as set forth in claim 11 wherein at least one of the hooks includes a spring urging the hook in a first direction about its pivotal connection to the basket portion when the hook is in the latching position and an opposite direction about the pivotal connection when the hook is in the latching position.

19. The invention as set forth in claim 11 wherein the hooks include a J-shaped capturing portion and have pivotal axes located above the capturing portion when the hooks are in the latching position.

20. The invention as set forth in claim 19 wherein the cylinder structure is extendible when the hooks are in the latching positions for lifting the pins from the capturing portion prior to movement of the hooks to the open position.

\* \* \* \* \*